United States Patent [19]

Gray

[11] Patent Number: 4,574,113
[45] Date of Patent: Mar. 4, 1986

[54] RECHARGEABLE CELL

[75] Inventor: Richard T. Gray, Levittown, Pa.

[73] Assignee: Rohm and Haas Company, Philadelphia, Pa.

[21] Appl. No.: 283,325

[22] Filed: Jul. 15, 1981

Related U.S. Application Data

[63] Continuation-in-part of Ser. No. 199,141, Oct. 22, 1980.

[51] Int. Cl.[4] .................. H01M 4/60; H01M 4/40; H01M 10/40
[52] U.S. Cl. .................................... 429/194; 429/213
[58] Field of Search ..................... 429/194, 197, 213

[56] References Cited

U.S. PATENT DOCUMENTS

| | | | |
|---|---|---|---|
| 3,907,597 | 8/1975 | Mellors | 429/197 |
| 4,181,779 | 1/1980 | Teo | 429/199 |
| 4,194,062 | 3/1980 | Carides et al. | 429/218 |
| 4,321,114 | 3/1982 | MacDiarmid et al. | 429/213 |

FOREIGN PATENT DOCUMENTS

| | | |
|---|---|---|
| 2146947 | 12/1973 | France . |
| 1216549 | 12/1970 | United Kingdom ............... 429/213 |

OTHER PUBLICATIONS

Yoshimura, Molecular Metals, Edited by William E. Hatfield, NATO Conference Series VI: Materials Science, 1978, pp. 471–489.

Jozefowicz, Conductivity of High Polymer Compounds in the Solid State, and Devices, Proceedings of the NATO Sponsored Advanced Study Institute, Belgirate, Italy, pp. 623–636.

Lazzari, A Cyclable Lithium Organic Electolyte Cell Based on Two Intercalation Electrodes, J. Electrochem. Soc. Accelerated Brief Communication, Mar. 1980, pp. 773–774.

*Primary Examiner*—Donald L. Walton
*Attorney, Agent, or Firm*—Marc S. Adler

[57] ABSTRACT

A high energy density substantially anhydrous cell comprises a cathode which comprises a mixture of polyacetylene powder and an electrically conductive material, an organic solvent, an electrolyte comprising a salt which is soluble in the organic solvent and an inorganic intercalating anode. The anode preferably has a potential less than about +1.3 V with respect to $Li^+/Li^\circ$ and the anions of the electrolyte salt are capable of p-doping the polyacetylene when an external electrical power source is supplied to the cell. The cathode itself is insoluble in the electrolyte solvent when the cathode is undoped or p-doped and the electrolyte solvent is stable to electrochemical decomposition.

13 Claims, No Drawings

RECHARGEABLE CELL

BACKGROUND OF THE INVENTION

This application is a continuation-in-part of my copending application, Ser. No. 199,141, filed Oct. 22, 1980.

This invention relates to a high energy density cell. More particularly this invention relates to a high energy density cell having a polyacetylene-containing cathode and an inorganic intercalating anode.

A lithium anode in a cell is, when considering the efficiency of the cell, highly desirable because the use of a lithium anode results in a very high voltage at a very low equivalent weight.

Lithium however tends to react with the organic electrolyte solvent present in the cell. When this happens, the reacted lithium is lost for recycling purposes thereby reducing the efficiency of the cell and such loss leads to a premature demise of the cell. Additionally, the reaction product of the lithium and organic electrolyte solvent is deposited on the anode and the anode eventually becomes insulated from participation in the electrochemical reactions of the cell thereby leading to cell failure.

Further, lithium tends to form dendrites during recharge. These dendrites, which are a furry, poorly adherent form of lithium, tend to fall from the anode and are thereby removed from the electrochemical reactions of the cell. Additionally, the falling of this furry form of lithium may eventually lead to short circuiting of the cell because of the eventual bridging of the lithium from the anode to the cathode.

One prior attempt to solve the problems associated with the use of a lithium anode was to use an electrolyte solvent, 2-methyltetrahydrofuran and an electrolyte of lithium hexafluoroarsenate. Although this combination had some positive effect on the cyclability of lithium, the increased cyclability was still somewhat limited and excess lithium had to be employed to compensate for the lithium lost to the system.

Another attempt to solve the problems associated with the use of a lithium anode was to use an anode composed of a lithium-aluminum alloy. The use of a lithium-aluminum alloy as an anode only minimally reduced the reactivity of the lithium and therefore was not an effective solution to the aforedescribed problems.

In an article entitled "Organic Battery Uses Polyacetylene Electrodes" appearing in Chemical and Engineering News, pages 39 and 40, Jan. 26, 1981, a cell is disclosed which contains an n-doped polyacetylene film anode (an organic anode) and a p-doped polyacetylene film cathode. The electrolyte disclosed is tetra-N-butylammonium perchlorate. This cell, although having some interesting characteristics, suffered from the disadvantage of having a low energy density. Additionally, because lithium is lacking in that cell, although the disadvantages of lithium are not present, neither are the advantages of lithium present. Further, the polyacetylene film of the anode and cathode will, with the passage of time, suffer a loss of their electrical conductivity properties thereby reducing the efficiency of the cell.

It is known that certain inorganic anodes will intercalate lithium or sodium ions. See for example J Electrochem. Soc., Accelerated Brief Communication, pages 773 and 774 entitled "A Cyclable Lithium Organic Electrolyte Cell Based on Two Intercalation Electrodes", M. Lazzari, et al, March, 1980; J Electrochem. Soc., D. Murphy et al, pages 349 through 351, entitled "Low Voltage Behavior of Lithium/Metal Dichalcogenide Topochemical Cells", March, 1979; and J. Electrochem. Soc., pages 2097 through 2099, Gerald H. Newman, et al, entitled "Ambient Temperature Cycling of an Na—$TiS_2$ Cell", October, 1980. The term intercalating or intercalation, as used in the specification and claims, means the ability of an inorganic anode to absorb lithium or other metal ions so that the lithium or other metal ion complexes or otherwise associates itself with the inorganic anode without ever forming lithium or other metal from such ions.

U.S. Pat. No. 4,222,903 is directed to p-type electrically conductive doped polyacetylene film and a method for preparing such film. U.S. Pat. No. 4,204,216 is directed to electrically conductive doped polyacetylene film exhibiting n-type electrical conductivity and a method for preparing the same. Both of those patents disclose that p-doped polyacetylene powder has been prepared by Berets et al., Trans. Faraday Soc. Volume 64, page 823 through 828 (1968). Both of those patents disclose that the highest room temperature electrical conductivity which Berets, et al achieved is still relatively low. Thus indicating that the electrical conductivity properties of polyacetylene powder are not as great as the electrical conductivity properties of polyacetylene film. As stated previously, p-doped polyacetylene film will, with the passage of time, suffer a loss of its electrical conductivity properties thereby severely reducing the efficiency of a cell utilizing a p-doped polyacetylene cathode.

It is an object of this invention to provide a superior cell having a polyacetylene containing cathode with stable electrical conductivity properties and an inorganic intercalating anode.

An additional object of this invention is to provide a superior recyclable cell.

Other objects and advantages will become apparent from the following more complete description and claims.

DETAILED DESCRIPTION

Broadly, this invention contemplates a substantially anhydrous cell comprising a cathode which comprises a mixture of polyacetylene powder and an electrically conductive material, an organic solvent, and an electrolyte comprising a salt which is soluble in said solvent and an inorganic intercalating anode, said cathode being insoluble in said solvent when said cathode is either undoped or p-doped, said solvent being stable to electrochemical decomposition and the anions of said salt being capable of p-doping said polyacetylene when an external electrical power source is supplied to said cell.

The cell of the present invention not only has a high energy-density, but also exhibits enhanced recyclabilty because the cell does not have the problems associated with the use of a lithium metal anode.

The anode of the cell may be composed of any inorganic intercalating electrode material and preferably an inorganic intercalating material having a potential less than about $+1.3$ V with respect to $Li^+/Li^0$. The anodic material is able to intercalate ions of one or more of lithium, sodium or potassium without resulting in the formation of the zero-valent metal of the ions which are intercalated by the anodic material.

The inorganic intercalating anodic battery grade materials which may be used include titanium disulfide (first and second plateaus), vanadium diselenide (first and second plateaus), vanadium disulfide (first and second plateaus), tungsten dioxide, molybdenum dioxide, and other transition metal dichalcogenides and the like.

Among the preferred anodic materials which have a potential less than about +1.3 V with respect to $Li^+/Li^o$ and which are capable of intercalating ions of one or more of lithium, sodium or potassium are the following battery grade materials: tungsten dioxide, the second plateau of vanadium diselenide, the second plateau of vanadium disulfide, the second plateau of titanium disulfide, molybdenum dioxide, and the like.

The use of the second plateau of titanium disulfide as the anodic material is extremely efficient in intercalating lithium ions and a cell employing such material exhibits a very high voltage.

The term "battery grade" has been used above in describing the materials which may be used to prepare the inorganic intercalating anode. The term "battery grade" refers to the stoichiometry of the inorganic intercalating material and may also refer to the crystalline or other physical characteristic of the inorganic intercalating material. For example, U.S. Pat. No. 4,084,046 refers to stoichiometric titanium disulfide ($Ti_1S_2$) as being useful as a cathode in a cell. The '046 patent also sets forth that the titanium disulfide should have a single hexagonal phase and a particle size surface area between about 2 and 4 square meters per gram and that the titanium disulfide have crystallites with small aspect ratios, i.e. the ratio of the basal plane axis to the vertical axis. U.S. Pat. No. 4,194,062, in describing the use of sulfides and selenides of vanadium and titanium as electrodes in a cell, sets forth that when these materials are used as intercalating materials in a cell, as either the positive or negative electrode, the composition of the intercalating materials may deviate by as much as plus or minus five percent from stoichiometry. U.S. Pat. No. 4,233,375 sets forth a number of intercalating materials useful as a cathode in a cell. The materials set forth in the '375 patent include $TiS_y$ and $VSe_y$ wherein y is a numerical value of about 1.8 to about 2.2; and $VS_a$ wherein a is a numerical value of about 1.8 to about 2.7.

In general, one skilled in the art will readily be able to determine the preferred deviation, if any, from the stoichrometric formula, of any of the intercalating materials set forth herein.

Although the ions being intercalated may be ions of lithium, sodium or potassium, it is preferred that the ions being intercalated be lithium because of the low equivalent weight of lithium and the ease with which lithium is intercalated.

The cathode is composed of polyacetylene powder and an electrically conductive material. When the cathode is electrochemically p-doped, it then becomes a p-doped cathode. Any cathode of a cell, must perform two functions. The cathode must provide the electron-transfer half-reaction (the other half-reaction is provided by the anode) and additionally, must have sufficient electrical conductivity to collect and transport these electrons. Polyacetylene powder provides the electron-transfer half reaction and some electrical conductivity.

In the present invention, the cathode is a composite of polyacetylene powder and an electrically conductive material. By providing a cathode composed of an electrically conductive material and polyacetylene powder, the cell life becomes vastly improved and rechargeability of the cell is enhanced because, the electrically conductive material performs the function of electron transport and the polyacetylene powder performs its function of providing the electron-transfer half-reaction.

The electrically conductive material, in order to be useful in this invention, should have a stable electrical conductivity of at least about $10^{-6} (ohm\text{-}cm)^{-1}$. Additionally, the electrically conductive material must be completely insoluble in the electrolyte solvent and must be electrochemically inert under the strong oxidizing conditions present during recharge of the cell and the milder reducing conditions present during discharge of the cell.

The electrically conductive material used in this invention will also be determined by the intended function of the cell. For example, for a heart pace maker, the cell utilized generally has a low drain. In such a case, an electrically conductive material having a minimal electrical conductivity could be utilized. In other applications, such as an electric car, the cell must have a high drain and a more electrically conductive material, such as a carbon, would be used.

Any electrically conductive material may be used which meets the requirements set forth above and which can be intimately associated with the polyacetylene matrix so as to provide stable electrical conductivity throughout the cathode.

Among the electrically conductive materials which may be used are the carbons such as carbon black, acetylene black, graphite and the like and mixtures thereof.

Other electrically conductive materials may also be used, provided they meet the requirements set forth above. These other materials may be gold, platinum palladium, rhodium, silver, mercury, selenium, silicon and conductive polymers, such as polypyrrole and poly(sulfur nitride).

The amount of electrically conductive material which is associated with the polyacetylene may vary from about 3% to about 75% by weight of the electrically conductive material based on the total weight of polyacetylene plus electrically conductive material. Although amounts of less than about 3% may used, such lesser amounts may adversely affect the electrical conductivity of the electrode. It should be understood however that it is preferred to use the minimum amount of electrically conductive material necessary to achieve stable electrical conductivity of the cathode as well as intimate association of the electrically conductive material with the polyacetylene matrix because such minimum amount will only minimally increase the cell dead weight. Amounts in excess of 75% are also not desired because such excessive amounts will only add to the cell dead weight and will therefore adversely affect the energy density of the cell.

In a particularly preferred embodiment, polyacetylene powder is mixed with a carbon, such as carbon black or graphite.

When polyacetylene powder and a powdered electrically conductive material are mixed together, the electrically conductive material should have a particle size such that intimate mixing of the electrically conductive particles with the polyacetylene particles will be accomplished. In the battery art, when powdered materials are used such powdered materials generally have a particle size of, for example, 30 millimicrons.

The cathode is prepared from polyacetylene powder and an electrically conductive powder material. After intimate mixing of the powders, it is often desirable to compress the powder mixture so that it can be more easily handled. Alternatively, the powder mixture may be poured on a support which is to serve as a separator in the cell. Additionally, the powder mixture may be compressed into a disc. Further, if desired, a binder such as polytetrafluoroethylene, may be used to hold the polyacetylene powder-electrically conductive material disc together.

The cathode may be electrochemically p-doped in a manner similar to that disclosed in the Journal of the Chemical Society Chemical Communications, #14, page 594, Nigrey et al., July, 1979.

In practicing this invention, a cell may be constructed having a titanium disulfide anode, a polyacetylene powder-electrically conductive material mixture as the cathode and an electrolyte of lithium hexafluoroarsenate dissolved in sulfolane. Thereafter, when a current is passed through the cell the cathode is p-doped with hexafluoroarsenate ions. In practice, the electrochemical p-doping is continued until the desired charge is obtained, as measured by an ammeter.

Alternatively, one may utilize a cathode, according to this invention, which has been p-doped prior to assembly in a cell.

The electrolyte used must be a salt of the metal ion to be intercalated and must be soluble in the electrolyte solvent, preferably in an amount of at least 5% by weight of the electrolyte solvent and more preferably at least 20% soluble in said solvent, and even more preferably 40% soluble and most preferably even more than 40% soluble. When the electrolyte used is less than 5% soluble in the electrolyte solvent, the effectiveness of the cell decreases. For example, when the electrolyte used is less than 1% soluble, a minimally effective cell is obtained.

Generally, the greater the solubility of the electrolyte in the solvent, the more efficient will be the cell. Among the electrolytes which may be used are the salts of perchlorates, tetrafluoroborates, hexafluorophosphates, hexafluoroarsenates, hexafluoroantimonates, fluorosulfonates, trifluoromethanesulfonates, tetrachloroaluminates, and the like.

The solvent for the electrolyte may be any organic solvent in which the electrolyte is soluble, as aforestated, but one in which the p-doped and undoped cathode is insoluble.

The solvent which is used must be substantially inert to both the cathode and anode, must be capable of dissolving the electrolyte in at least the minimum amounts set forth herein and must be stable to electrochemical decomposition.

The solvents which may be used are sulfones including cyclic sulfones, ethers including cyclic ethers, organic carbonates including cyclic carbonates, esters, lactones, organic sulfites, amides and the like.

Among such organic solvents may be mentioned propylene carbonate, sulfolane, dimethoxyethane, bis (methoxyethyl) ether, dioxane, 3-methylsulfolane, tetrahydrofuran, ethylene carbonate, methyl formate, butyrolactone, dimethyl sulfite, dimethylformamide, and the like.

The cell is generally assembled under anhydrous conditions to eliminate the deleterious effect of water in connection with the operation of the cell.

The cell itself may be a thin cell, such as a button cell. A multitude of layers may be disposed one on top of the other and connected to one another in series or in parallel.

In order to more fully illustrate the nature of this invention and the manner of practicing the same, the following example is presented.

EXAMPLE 1

In a glass cup is placed a saturated solution of lithium hexafluoroarsenate in sulfolane. A disc is formed of battery grade $TiS_2$ obtained from Exxon Enterprises (disc having a surface area of 0.85 cm$^2$). The disc weighs 120 mg. and is suspended in the solution as a cathode and a lead is attached thereto. A piece of lithium (in excess of the amount necessary) is suspended in the solution as an anode and a lead is attached thereto. The leads are connected to a constant current power supply. The cell is discharged at 1 ma for six hours still leaving the $TiS_2$ on the first plateau. The lithium anode is disconnected from the power supply. A disc, pressed onto a nickel screen and containing 15 mg. of polyacetylene powder, 12 mg. of finely divided carbon and 3 mg. of a polybutadiene binder, is suspended in the solution and a lead attached thereto and connected to the constant current power supply. The $TiS_2$ electrode is now the anode with respect to the more positive polyacetylene containing electrode, which is the cathode. The lithium electrode is left suspended in the solution as a reference electrode. The cell is charged at 1 ma. During charge, the voltage rises to about 1.6 V after two hours. The cell is discharged. The cell is allowed to stand for about three weeks in its discharged condition. Cycling is then resumed and the cell is successfully recycled a number of times.

Experiments conducted with non-battery grade vanadium disulfide; non-battery grade tungsten dioxide; and non-battery grade titanium disulfide all resulted in ineffective batteries.

Although this invention has been described in terms of certain preferred embodiments and illustrated by means of a specific example, the invention is not to be construed as limited except as set forth in the following claims.

I claim:

1. A substantially anhydrous cell comprising a cathode which comprises a mixture of polyacetylene powder and an electrically conductive material, an organic solvent, an electrolyte comprising a salt which is soluble in said solvent and an inorganic intercalating anode, said cathode being insoluble in said solvent when said cathode is either undoped or p-doped, said solvent being stable to electrochemical decomposition and the anions of said salt being capable of p-doping said polyacetylene when an external electrical power source is supplied to said cell.

2. A substantially anhydrous cell according to claim 1 wherein said anode has a potential less than about +1.3 V with respect to $Li^+/Li^0$.

3. A substantially anhydrous cell according to claim 1 wherein said electrolyte is a salt of lithium.

4. A substantially anhydrous cell according to claim 1 wherein said inorganic intercalating anode contains tungsten dioxide.

5. A substantially anhydrous cell according to claim 1 wherein said inorganic intercalating anode contains titanium disulfide.

6. A substantially anhydrous cell according to claim 1 wherein said electrically conductive material is carbon.

7. A substantially anhydrous cell according to claim 1 wherein said electrically conductive material is present in an amount of from about 3% to about 75%, based on the total weight of the cathode.

8. A substantially anhydrous cell according to claim 1 wherein said inorganic intercalating anode contains vanadium diselenide.

9. A substantially anhydrous cell according to claim 1 wherein said inorganic intercalating anode contains vanadium disulfide.

10. A substantially anhydrous cell according to claim 1 wherein said inorganic intercalating anode intercalates lithium ions.

11. A substantially anhydrous cell according to claim 1 wherein said electrolyte is lithium perchlorate.

12. A substantially anhydrous cell according to claim 1 wherein said electrolyte is lithium hexafluoroarsenate.

13. A cell comprising a cathode which comprises a mixture of polyacetylene powder and an electrically conductive material, an organic solvent, an electrolyte comprising a salt which is soluble in said solvent, and an inorganic intercalating anode, said cathode being insoluble in said solvent when said cathode is either undoped or p-doped, said solvent being stable to electrochemical decomposition and the anions of said salt being capable of p-doping said polyacetylene when an external electrical power source is supplied to said cell, said cell being substantially anhydrous.

* * * * *